(12) United States Patent
Ahn et al.

(10) Patent No.: US 11,654,470 B2
(45) Date of Patent: May 23, 2023

(54) MOLD STRUCTURE FOR FORMING SECONDARY BATTERY POUCH

(71) Applicant: Hyuk Ahn, Cheongju-si (KR)

(72) Inventors: Hyuk Ahn, Cheongju-si (KR); Sang Yong Lee, Cheongju-si (KR)

( * ) Notice: Subject to any disclaimer, the term of this patent is extended or adjusted under 35 U.S.C. 154(b) by 108 days.

(21) Appl. No.: 17/392,959

(22) Filed: Aug. 3, 2021

(65) Prior Publication Data
US 2022/0143670 A1     May 12, 2022

(30) Foreign Application Priority Data

Nov. 10, 2020    (KR) .................. 10-2020-0149155

(51) Int. Cl.
| | |
|---|---|
| B21D 22/02 | (2006.01) |
| H01M 50/105 | (2021.01) |
| H01M 50/119 | (2021.01) |
| H01M 10/04 | (2006.01) |

(52) U.S. Cl.
CPC ............ B21D 22/02 (2013.01); H01M 10/04 (2013.01); H01M 50/105 (2021.01); H01M 50/119 (2021.01)

(58) Field of Classification Search
CPC ........ B21D 22/02; B21D 24/16; B21D 37/10; B21D 37/12
See application file for complete search history.

(56) References Cited

U.S. PATENT DOCUMENTS 3,920,175 A * 11/1975 Hamilton ............... B23K 20/00
                                                          228/262.71

4,735,863 A * 4/1988 Bachmann ............. B21D 51/44
                                                          428/595

5,118,026 A * 6/1992 Stacher ................. B21D 26/055
                                                      228/262.71

FOREIGN PATENT DOCUMENTS

| JP | 3468818 | 11/2003 |
|---|---|---|
| JP | 2008-265158 | 11/2008 |
| KR | 10-0958376 | 5/2010 |
| KR | 10-2018-0134162 | 12/2018 |
| KR | 10-1937936 | 1/2019 |
| KR | 10-2019-0038094 | 4/2019 |
| KR | 10-2020-0000966 | 1/2020 |
| KR | 10-2131739 | 7/2020 |
| KR | 10-2146189 | 8/2020 |

OTHER PUBLICATIONS

English Specification of 10-2019-0038094.
English Specification of 10-1937936.
English Specification of 10-0958376.
(Continued)

*Primary Examiner* — Teresa M Ekiert
(74) *Attorney, Agent, or Firm* — Antonio Ha & U.S. Patent, LLC

(57) ABSTRACT

According to an embodiment, a mold structure comprises an upper mold having a convex portion in a lower surface thereof to press-form a thin aluminum sheet, a lower mold including a main mold part having a forming recess for forming the thin aluminum sheet placed thereon and an auxiliary mold part supporting the main mold part, a back plate spaced apart from an inside of the forming recess and supporting a lower surface of the aluminum sheet, and vacuum generator connected with air passages formed from two opposite sides of the auxiliary mold part to a bottom surface of the forming recess.

5 Claims, 8 Drawing Sheets

(56) References Cited

OTHER PUBLICATIONS

English Specification of 10-2020-0000966.
English Specification of 10-2146189.
English Specification of 10-2018-0134162.
English Specification of JP3468818.
English Specification of 10-2131739.
English Specification of JP2008-265158.

* cited by examiner

MOLD STRUCTURE FOR FORMING SECONDARY BATTERY POUCH

CROSS-REFERENCE TO RELATED APPLICATION(S)

This application is based on and claims priority under 35 U.S.C. 119 to Korean Patent Application No. 10-2020-0149155, filed on Nov. 10, 2020, in the Korean Intellectual Property Office, the disclosure of which is herein incorporated by reference in its entirety.

TECHNICAL FIELD

Embodiments of the disclosure relate to forming pouches for secondary batteries and, more specifically, mold structures for forming secondary battery pouches.

DESCRIPTION OF RELATED ART

The recent development of electric vehicles has significantly increased demand for secondary batteries.

Therefore, there are ongoing vigorous research efforts on secondary batteries to meet various needs.

Secondary batteries are divided into a pouch type, a cylindrical type, and a rectangular type according to the type of their exterior material. The pouch-type secondary batteries have electrode assemblies built in a metal laminate sheet pouch case.

Advantageously, the pouch-type secondary batteries may be easy to manufacture and low-manufacturing costs and may facilitate configuration of high-capacity battery packs by connection in series and/or parallel.

In general, a pouch of a secondary battery refers to a case for receiving the battery.

Conventionally, such a pouch is formed to receive a battery by bending an aluminum sheet using molds including an upper mold and a lower mold.

When the aluminum sheet is bent in a forming space of the lower mold, the bent portions, e.g., bent edges, of the aluminum sheet may be wrinkled, deteriorating the quality of the produced pouches.

SUMMARY

The disclosure has been conceived to address the foregoing problems.

According to an embodiment of the disclosure, there is provided a mold structure for forming a secondary battery pouch, which may prevent the pouch from wrinkling during manufacture.

According to an embodiment of the disclosure, there is provided a mold structure for forming a secondary battery pouch of better quality.

According to an embodiment, a mold structure comprises an upper mold having a convex portion in a lower surface thereof to press-form a thin aluminum sheet, a lower mold including a main mold part having a forming recess for forming the thin aluminum sheet placed thereon and an auxiliary mold part supporting the main mold part, a back plate spaced apart from an inside of the forming recess and supporting a lower surface of the aluminum sheet, and vacuum generator connected with air passages formed from two opposite sides of the auxiliary mold part to a bottom surface of the forming recess. The vacuum generators supplies or sucks air through the air passages. The back plate is spaced apart from the auxiliary mold part. The back plate is lowered by a forming pressure generated as the lower mold ascends and, if the forming pressure is released as the lower mold descends, the back plate is elevated. The back plate includes a plate portion supporting the lower surface of the aluminum sheet, a plurality of elastic springs each of which has an upper end elastically installed in the plate portion and a lower end elastically installed in the auxiliary mold part, and a connection sleeve having an upper end fastened to the plate portion and a lower end supported on a ceiling of a lower space of the auxiliary mold part and vertically slidable. The connection sleeve is lowered and raised according to the descent and ascent of the back plate to determine a range of the ascent of the back plate. the lower ends of the elastic springs remain unchanged in position in the auxiliary mold part regardless of the descent and ascent of the back plate. The air is discharged from, or introduced to, spaces around the back plate by sucking the air through the air passages by the vacuum generators to thereby create a vacuum low pressure in the forming recess or by supplying the air through the air passages by the vacuum generators to thereby release the vacuum low pressure.

According to an embodiment, the air passages include air flow pipe portions formed through the auxiliary mold part and connected with the vacuum generators to allow the air to flow therethrough and long hole portions connected with respective ends of the air flow pipe portions and the bottom surface of the forming recess.

According to an embodiment, the connection sleeve includes a coupling portion fastened to a lower surface of the plate portion, a sliding portion inserted through the auxiliary mold part to be vertically slidable, and a head portion supported on the ceiling of the lower space of the auxiliary mold part to restrict the ascent of the back plate.

According to an embodiment, a spacing gap is formed between the lower surface of the back plate and the bottom surface of the forming recess to space the back plate away from the bottom surface of the forming recess by a predetermined height. A side gap is formed between a side surface of the back plate and an inner wall surface of the forming recess to allow the air to flow therethrough to introduce or discharge the air through the long hole portions throughout an entire edge of the back plate.

According to an embodiment, a block-shaped detection structure protrudes from a side surface of the upper mold. A sensor is installed on a side surface, corresponding to the side surface of the upper mold, of the lower mold. The sensor is pressed by the detection structure to detect approach of the lower mold and the upper mold. The vacuum generators are activated as the sensor detects the approach.

According to an embodiment, when the descent of the lower mold is detected, the vacuum generators supply the air.

According to embodiments of the disclosure, when the lower mold 120 ascends and presses the aluminum sheet 101, the air may be sucked out by the vacuum generators 140 from the spaced around the back plates through the air passages, creating a vacuum low pressure and thus preventing the bent portions of the pouch from wrinkling. Thus, the so-produced pouch may have better quality.

Further, when the lower mold 120 ascends and press-forms the aluminum sheet into pouches, the back plates may elastically support the aluminum sheet 101 while being prevented from ascending a predetermined height or more by the connection sleeves.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

Figure 1:
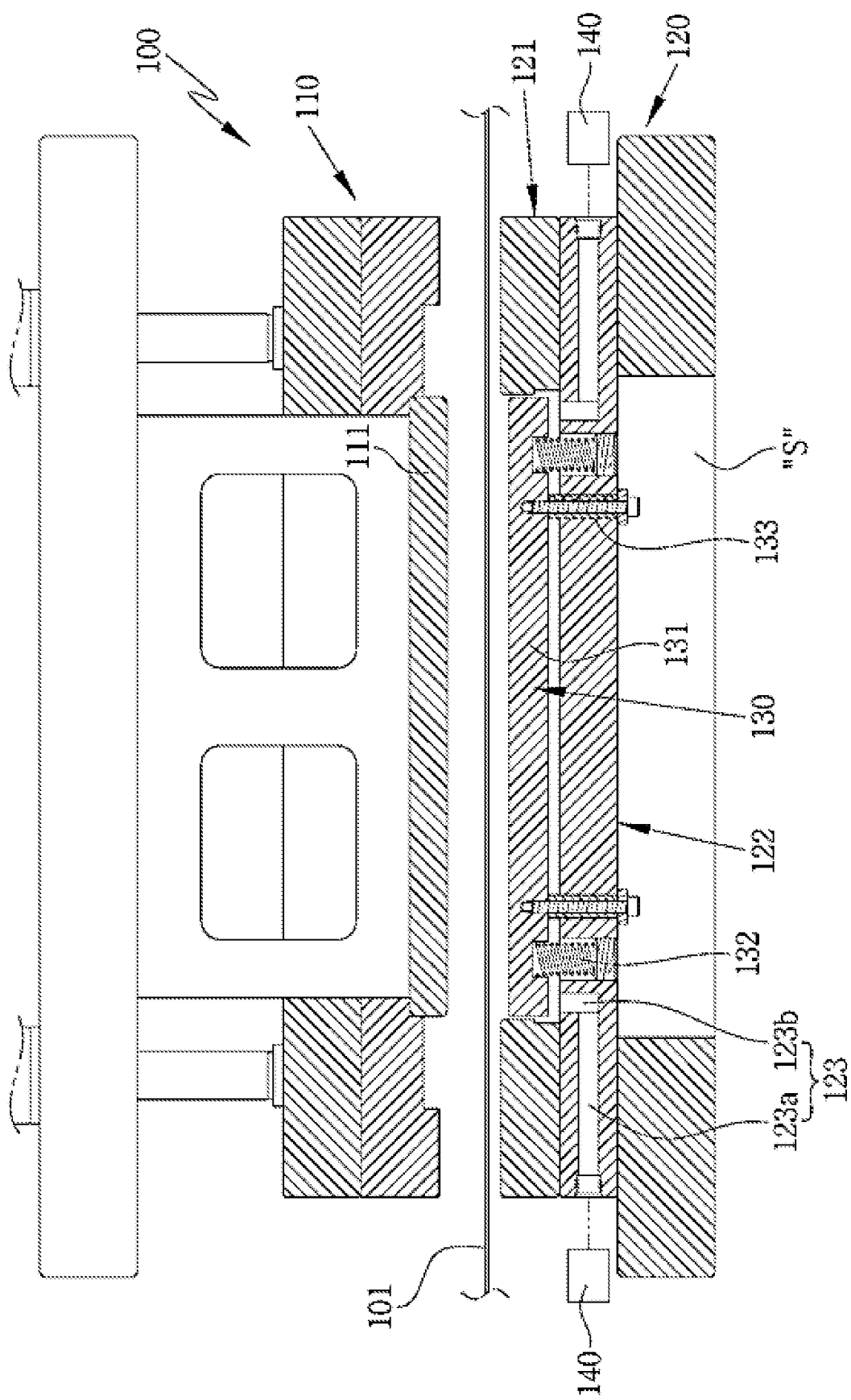
FIG. 1 is a cross-sectional view illustrating a mold structure in which an aluminum sheet is positioned between an upper mold and a lower mold according to an embodiment of the disclosure.

Hereinafter, preferred embodiments of the disclosure are described with reference to the accompanying drawings to be easily practiced by one of ordinary skill in the art.

Referring to FIGS. 1 to 8, according to an embodiment, a mold structure 100 for removing wrinkles of a secondary battery pouch includes an upper mold 110 having a convex portion in a lower surface thereof to press-form a thin aluminum sheet 101 and a lower mold 120 including a main mold part 121 formed with forming recesses 121a for forming the thin aluminum sheet 101 placed thereon and an auxiliary mold part 122 supporting the main mold part 121.

The main mold part 121 has a pair of forming recesses 121a in a front and rear direction. Back plates 130 are inserted into the forming recesses 121a while leaving gaps therebetween and support the aluminum sheet 101.

The auxiliary mold part 122 includes air passages 123 which are formed in two opposite side portions of the auxiliary mold part 122 and communicate with the bottom surfaces of the forming recesses 121a.

Vacuum generators 140 are connected with the air passages 123 to suck in air to form a vacuum lower pressure in the forming recesses 121a or to inject air to release the vacuum low pressure.

According to an embodiment, the thin aluminum sheet 101 is introduced between the upper mold 110 and the lower mold 120 and, if the lower mold 120 is elevated, the convex portion 11 presses the aluminum sheet 101 into the forming recesses 121a to bend and form the aluminum sheet 101 into a pouch 102 (also referred to as a 'case') having a space for receiving a secondary battery pack.

Although described herein is an embodiment in which the two forming recesses 121a are formed in the top surface of the lower mold 120 to simultaneously form two pouches for convenience of description, embodiments of the disclosure are not limited thereto. For example, two or more forming recesses 121a may be successively formed in the lower mold 120 to simultaneously form two or more pouches.

Each air passage 123 includes an air flow pipe portion 123a connected with the vacuum generator 140 and through which air flows and a long hole portion 123b that is formed at an end of the air flow pipe portion 123a and has a wide space communicating with the bottom surface of the forming recess 121a.

The long hole portion 123b, communicating with the bottom surface of the forming recess 121a, is positioned under the pair of back plates 130 to simultaneously communicate with the pair of back plates 130 and to simultaneously supply or suck air to/from the back plates 130.

Typically, a vacuum generator has both the function of sucking air from a target space to maintain the target space at a vacuum low pressure (below atmospheric pressure) and the function of supplying air to release the vacuum low pressure. According to an embodiment, the vacuum generator 140 sucks in the air through the air passage 123, with the upper surface of the forming recess 121a covered by the aluminum sheet 101, to thereby maintain, at a vacuum low pressure, a gap formed around the back plate 130 inserted in the forming recess 121a, or the vacuum generator 140 supplies air through the air passage 123 to release the vacuum low pressure of the gap formed around the back plate 130 inserted in the forming recess 121a.

The vacuum generator 140 may be a device that sucks or discharges air by directly pumping air, or the vacuum generator 140 may be any device that provides air to, or sucks air from, other components of the mold structure 100.

According to an embodiment, the long hole portions 123b having a wide space are formed in the auxiliary mold part 122 under the forming recesses 121a, and air flow from or into the forming recesses 121a may be smoothly performed by the long hole portions 123b.

The back plates 130 are inserted and installed in the forming recesses 121a and support the aluminum sheet 101 which is placed thereon.

The back plates 130 are installed in the forming recesses 121a so that the upper surfaces thereof are positioned to a predetermined depth (which is referred to as a forming height of the pouch).

Figure 2:
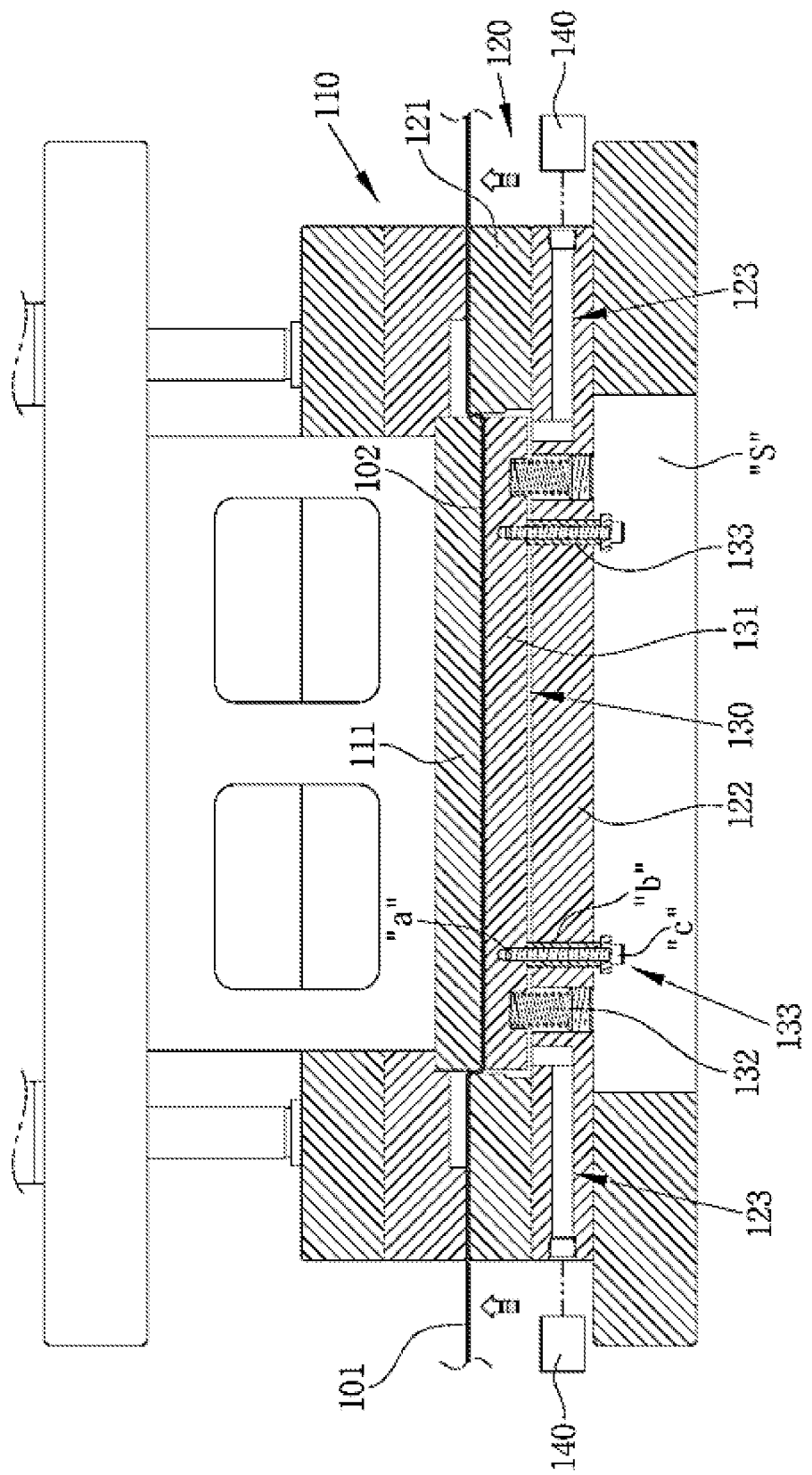
FIG. 2 is a cross-sectional view illustrating a mold structure in which an aluminum sheet is press-formed by an upper mold and a lower mold according to an embodiment of the disclosure.
Figure 3:
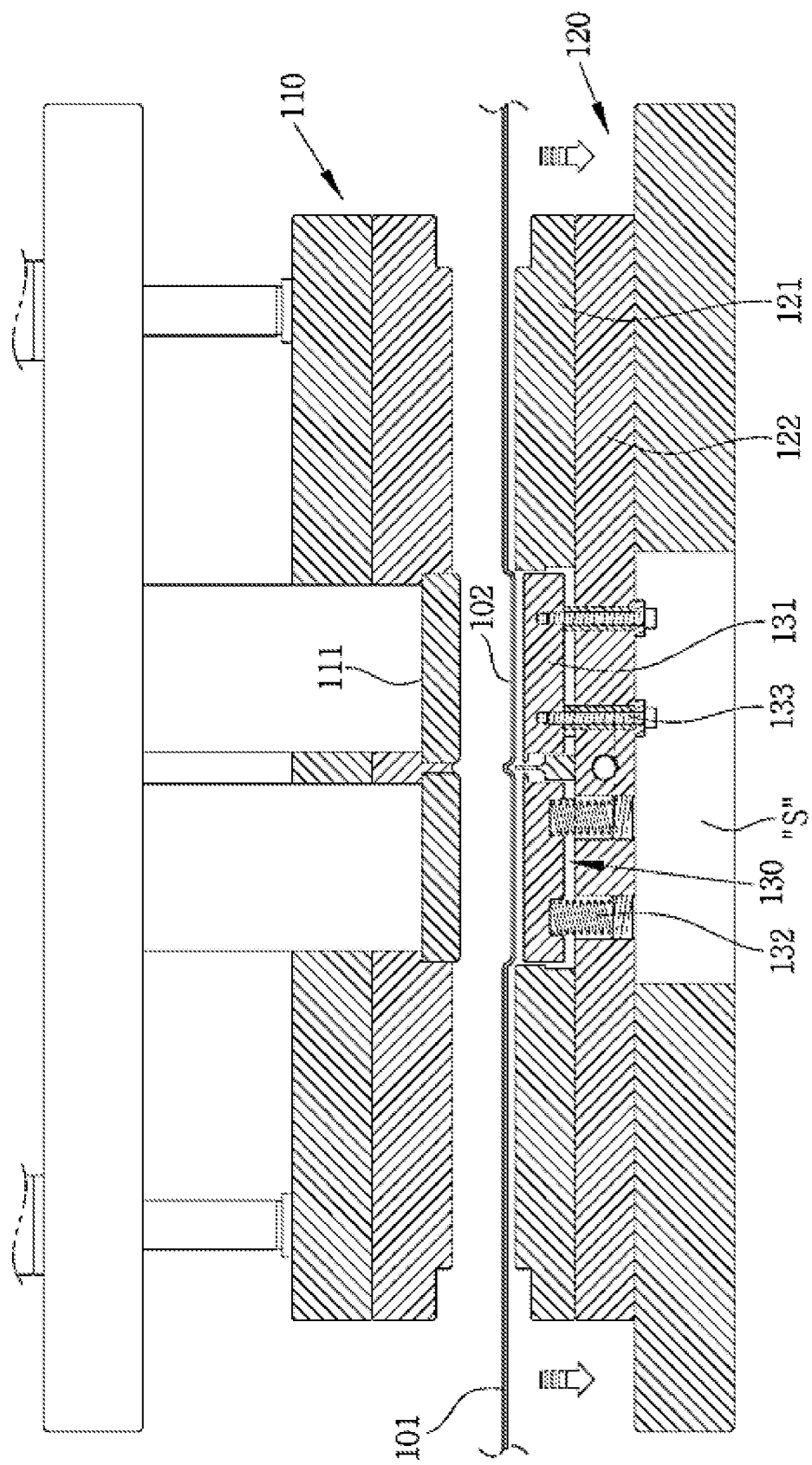
FIG. 3 is a cross-sectional view illustrating a mold structure in which after pouches are press-formed, a lower mold is lowered according to an embodiment of the disclosure.
Figure 4:
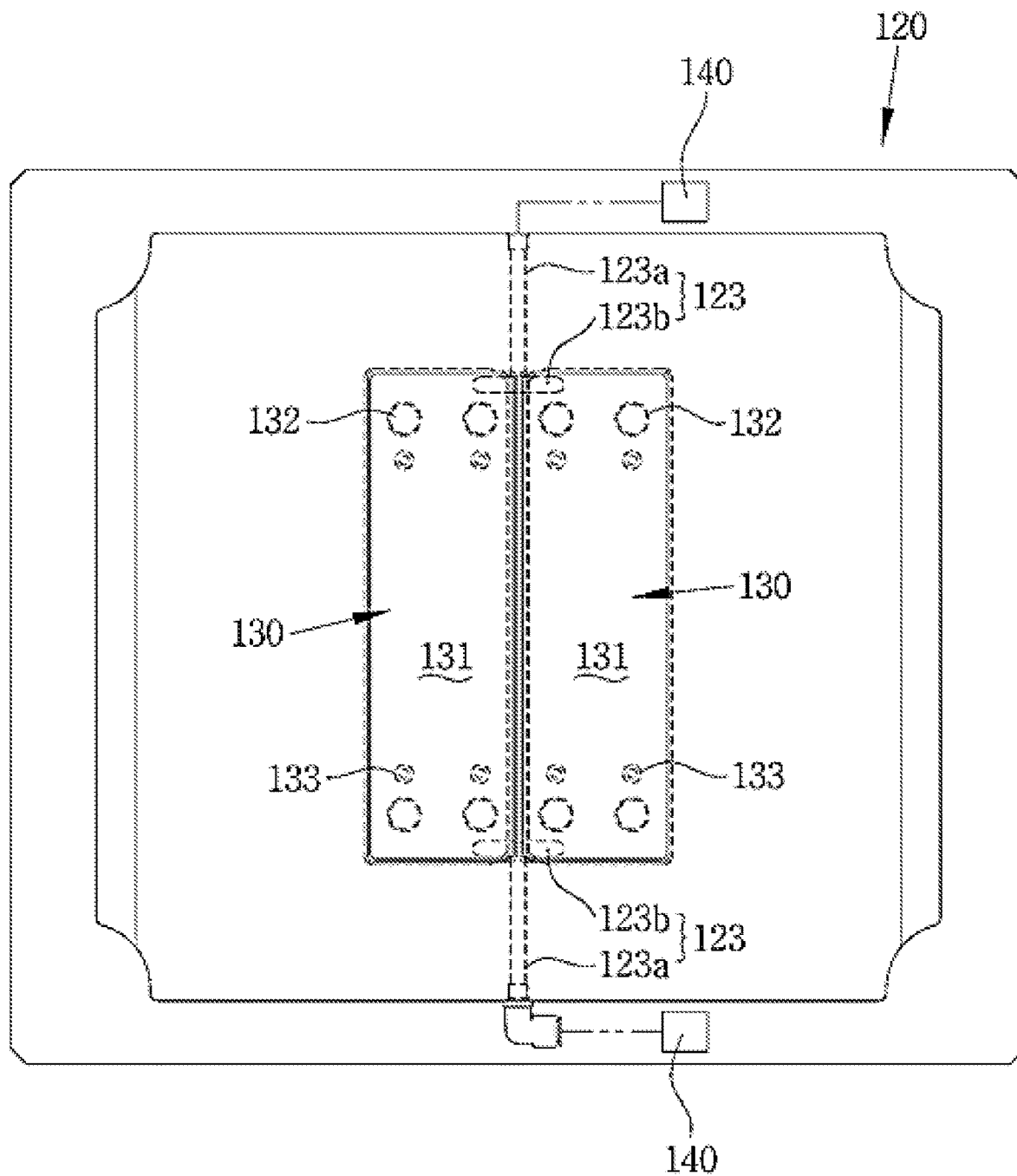
FIG. 4 is a plan view illustrating a mold structure according to an embodiment of the disclosure.
Figure 5:
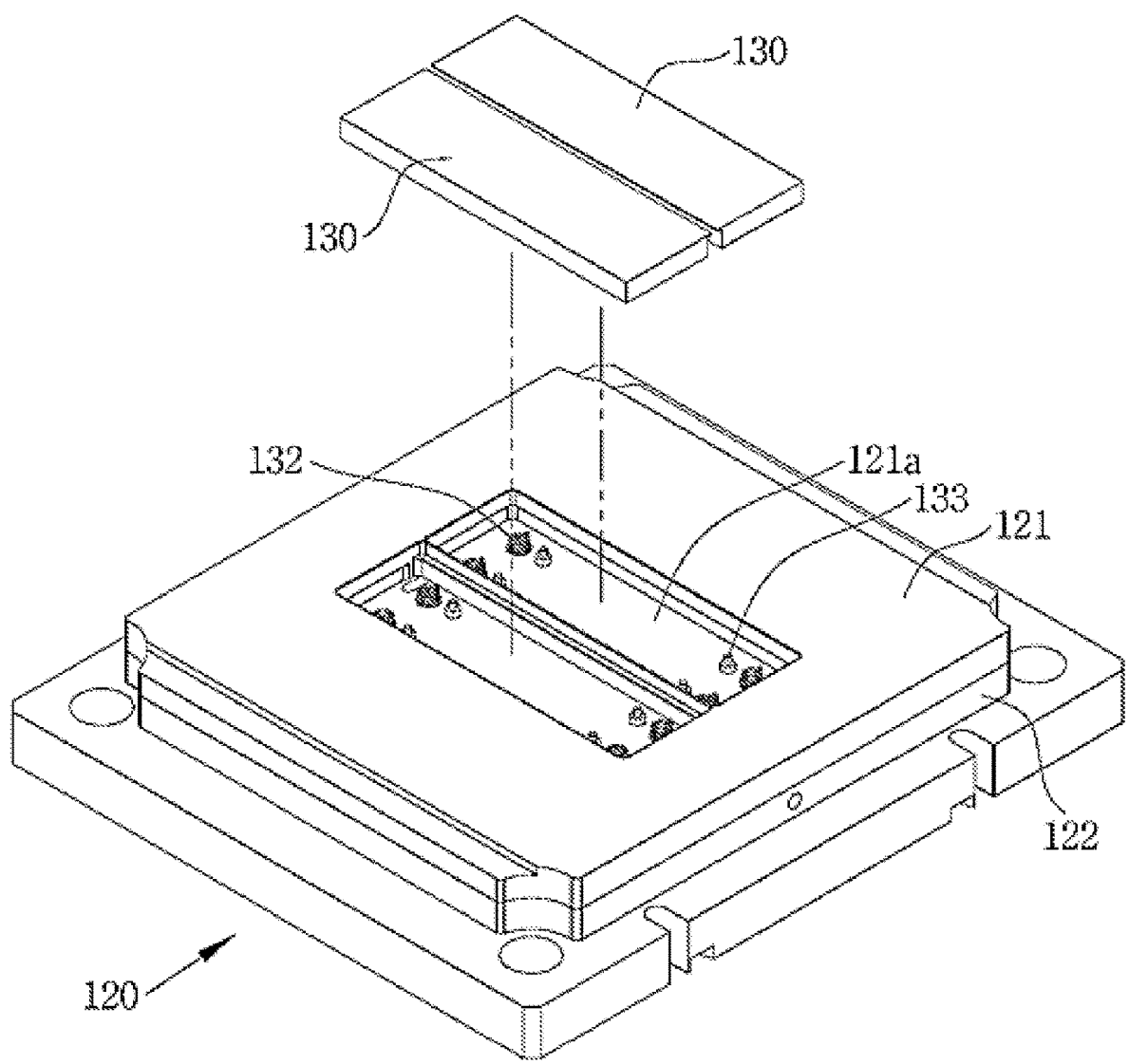
FIG. 5 is an exploded perspective view illustrating a mold structure in which back plates are removed according to an embodiment of the disclosure.
Figure 6:
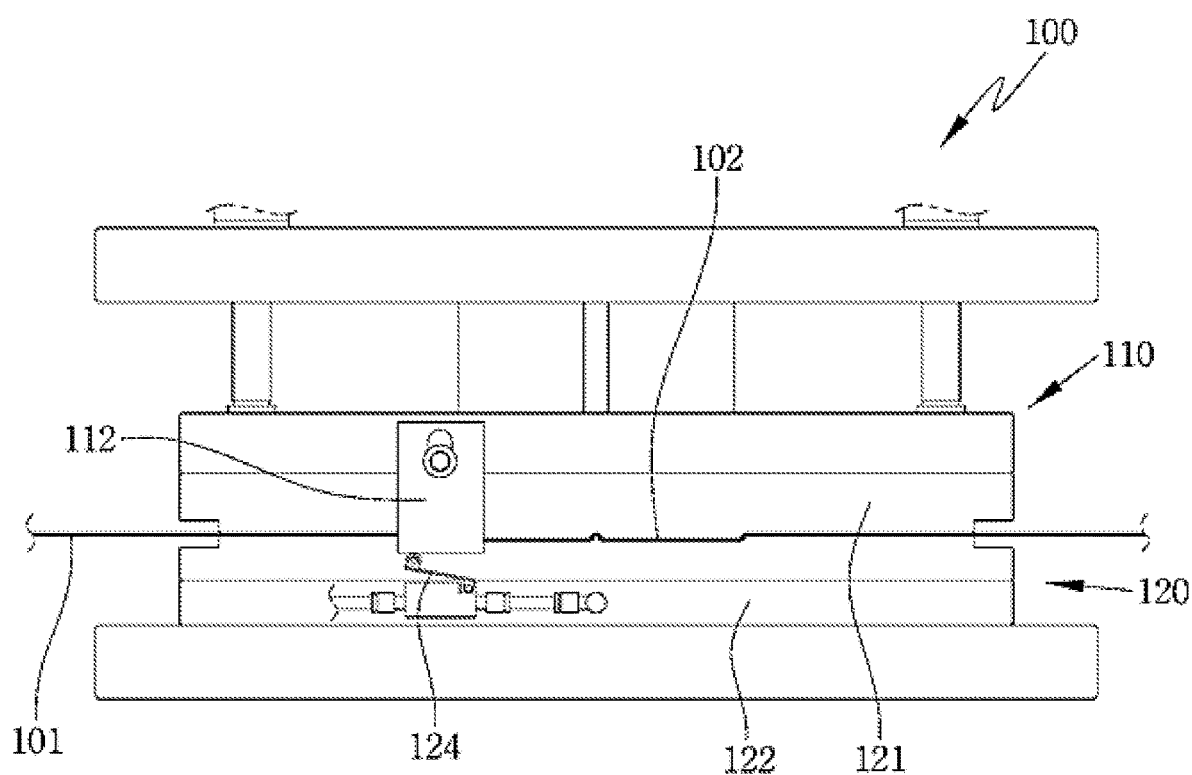
FIG. 6 is a side view illustrating a mold structure including a sensor and a detection structure according to an embodiment of the disclosure.
Figure 7:
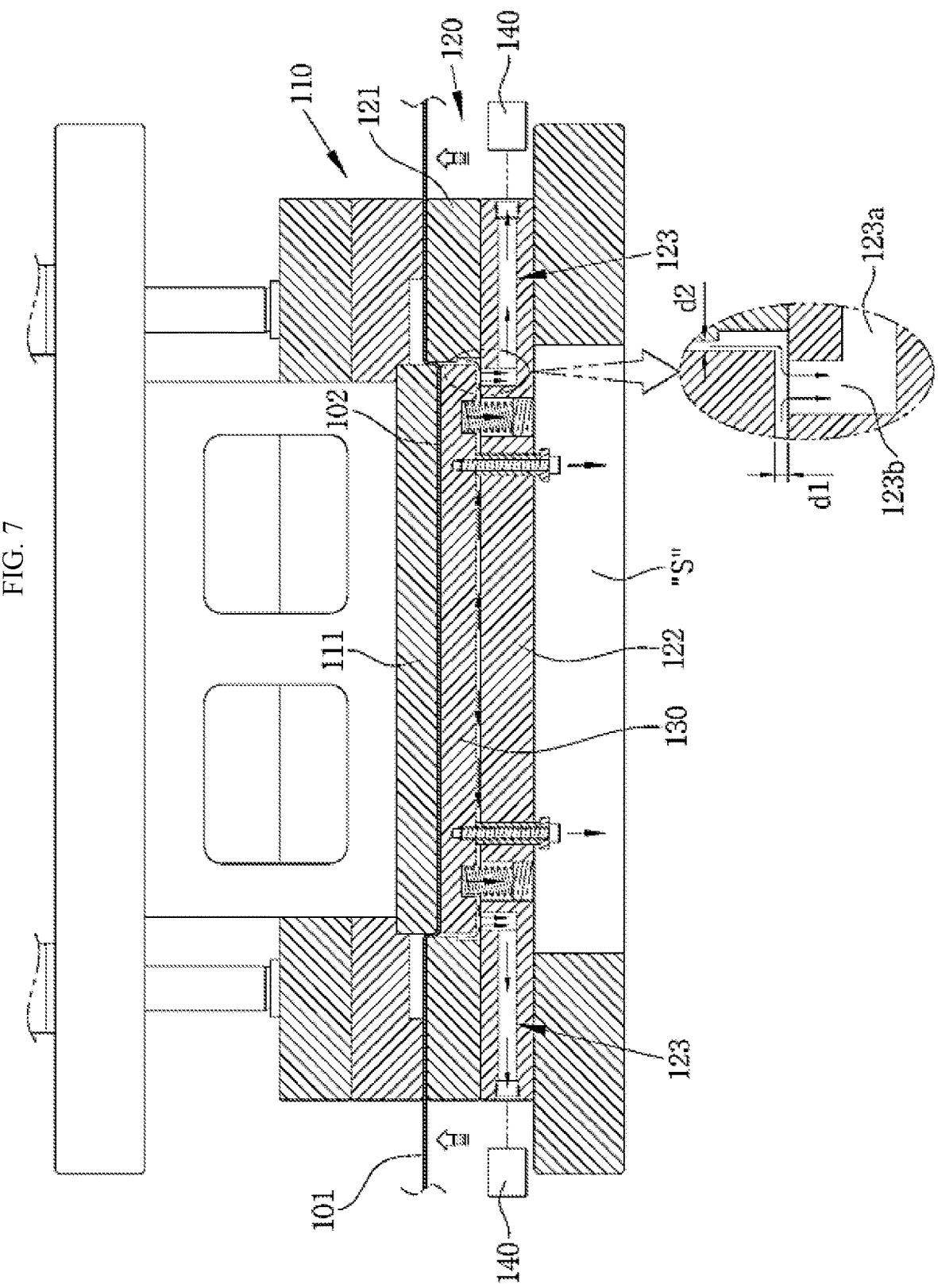
FIG. 7 is a cross-sectional view illustrating a mold structure in which pouches are formed while air is sucked out from gaps around back plates according to an embodiment of the disclosure.
Figure 8:
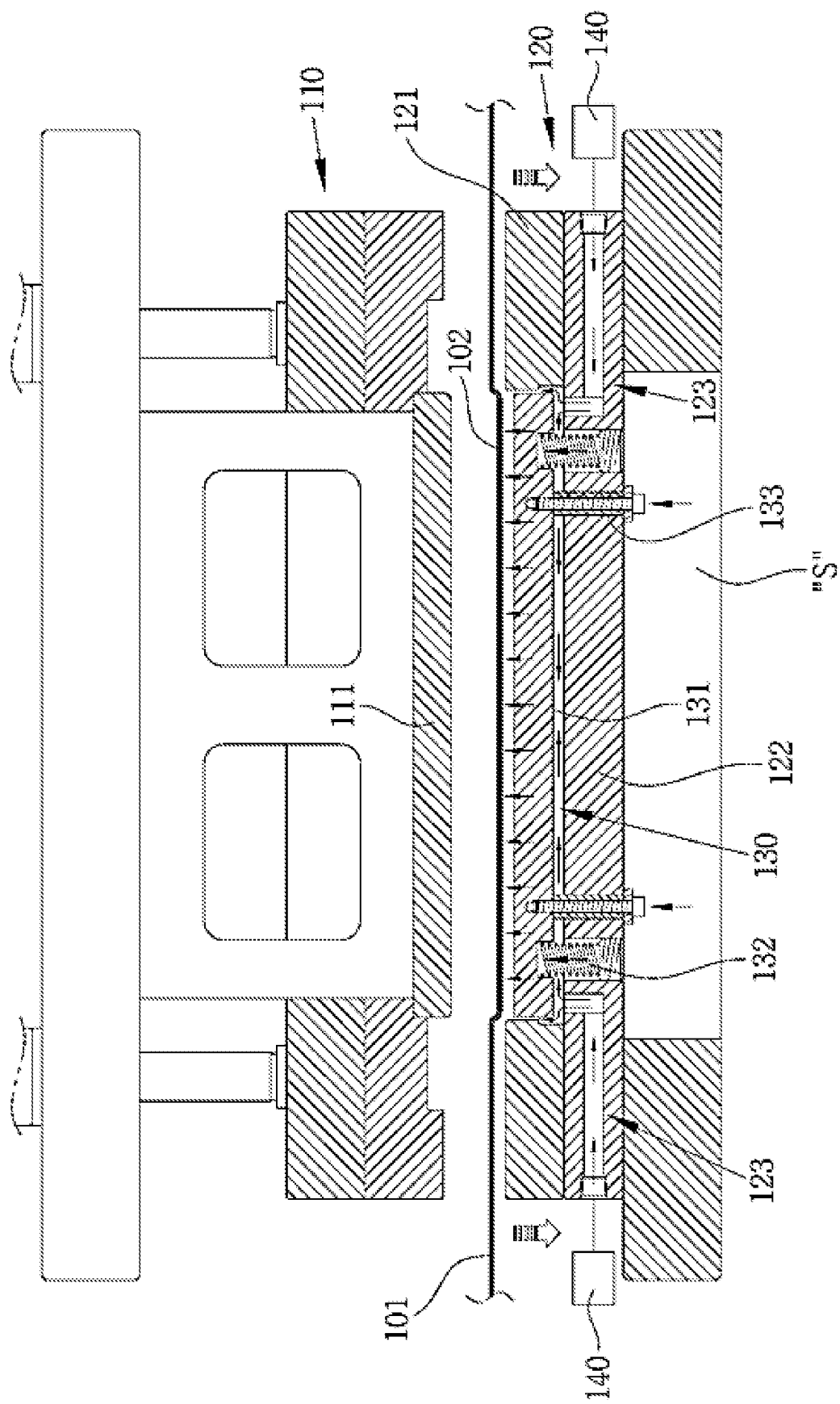
FIG. 8 is a cross-sectional view illustrating a mold structure in which formed pouches are removed as air is supplied to gaps around back plates according to an embodiment of the disclosure.

As illustrated in FIG. 2, the back plate 130 includes a plate portion 131 supporting the aluminum sheet 101, elastic springs 132 each including a lower end elastically installed in the auxiliary mold part 122 and an upper end elastically installed in the lower surface of the plate portion 131, and connection sleeves 133 slidably passing through the auxiliary mold part 122.

Each connection sleeve 133 includes a coupling portion a passing through the auxiliary mold part 122, a sliding portion b, and a head portion c. The coupling portion a is fastened to the lower surface of the plate portion 131. The head portion c is exposed to a lower space S of the auxiliary mold part 122.

The back plate 130 may be slid down by a predetermined distance in the forming recess 121a and prevented from ascending in the forming recess 121a by the connection sleeves 133, thereby enhancing the forming quality of the pouch 102.

In other words, if the forming pressure of the aluminum sheet 101 is applied to the back plate 130, the back plate 130 is pushed down while being elastically supported by the elastic springs 132, and the connection sleeves 133 are simultaneously lowered so that the head portions c descend in the lower space S of the auxiliary mold part 122. If the forming pressure to the back plate 130 is released, the back plate 130 is pushed up by the elastic restorative force of the elastic springs 132, and thus, the head portions c of the connection sleeves 133 ascend and are then stuck to the ceiling of the lower space S of the auxiliary mold part 122 and stopped from further ascending.

A spacing gap d1 of about 3 mm to about 4 mm is formed between the lower surface of the back plate 130 and the bottom surface of the forming recess 121a. A side gap d2 is formed between the side of the back plate 130 and the inner wall surface of the forming recess 121a to allow air to enter or exit therethrough. As such, as the gaps d1 and d2 are formed around the pair of back plates 130 to allow the air to flow therethrough, air may be introduced from the outside or discharged to the outside along the gaps throughout the back plates 130.

Therefore, if the air is sucked by the vacuum generators 140, the air is discharged from the spacing gaps d1 and the side gaps d2 through the air passages 123 connected with the vacuum generators 140, so that a vacuum low pressure is formed in the spaces and, if the air is supplied by the vacuum generators 140, the air is introduced into the spacing gaps d1 and the side gaps d2 through the air passages 123 connected with the vacuum generators 140, so that the vacuum low pressure formed in the spaces is released.

As described above, in the mold structure 100, if the gaps d1 and d2 around the back plates 130 are rendered to have a vacuum low pressure by the vacuum generators 140, a vacuum low pressure is created under the aluminum sheet 101 mounted on the forming recesses 121a and reaches and affects the bent edge portions of the aluminum sheet 101, so that the bent edge portions may be uniformly formed wrinkle-free, thus significantly enhancing the forming quality of the pouches 102.

In other words, when the aluminum sheet 101 is bent, the bent edge portion is stretched out by the vacuum low pressure and prevented from wrinkling.

A block-shaped detection structure 112 protrudes from a side surface of the upper mold 110, and a sensor 124 is installed, under the detection structure 112, on a side surface of the lower mold 120. The sensor 124 may be pressed by the detection structure 112 to recognize approach of the upper mold 110 and the lower mold 120 to each other. The vacuum generators 140 may be driven according to sensing by the sensor 124.

Thus, if the lower mold 120 ascends, and thus, the sensor 124 detects the detection structure 112 under the control of a controller (not shown), the vacuum generators 140 may be activated to suck the air from the gaps around the back plates 130 through the air passages 123, creating a vacuum low pressure.

In this case, the aluminum sheet 101, mounted on the main mold part 121, is pressed by the convex portion 111 of the upper mold 110 and is thus formed into the pouches 102.

When the aluminum sheet 101 is formed into the pouches 102, the air is simultaneously sucked and discharged throughout the entire edge of the pair of back plates 130, so that while the aluminum sheet 101 descends, the flat surface of the aluminum sheet 101 is stretched out by the back plates 130, and the edges of the aluminum sheet 101 are bent without creating wrinkles by the discharged air. The bent edges are about 4 mm to about 7 mm deep and are stretched by the vacuum generators 140 along the lower mold 120 which ascends by the depth. If the lower mold 120 stops ascending, the suction by the vacuum generators 140 ends.

If the lower mold 120 descends, the descent of the lower mold 120 or the operation of the motor or cylinder, which moves the lower mold 120, is detected, and the vacuum generators 140 may be operated in an opposite way, so that air is supplied through the air passages 123 to the gaps around the back plates 130 to release the vacuum low pressure, and the forming of the pouches 102 terminates. The formed pouches 102 are carried out.

According to an embodiment, the above-described cycle may be repeated to successively form and produce pouches.

According to embodiments of the disclosure, when the lower mold 120 ascends and presses the aluminum sheet 101, the air may be sucked out by the vacuum generators 140 from the spaced around the back plates through the air passages, creating a vacuum low pressure and thus preventing the bent portions of the pouch from wrinkling. Thus, the so-produced pouch may have better quality.

What is claimed is:

1. A mold structure, comprising:
   an upper mold having a convex portion in a lower surface thereof to press-form a thin aluminum sheet;
   a lower mold including a main mold part having a forming recess for forming the thin aluminum sheet placed thereon and an auxiliary mold part supporting the main mold part;
   a back plate spaced apart from an inside of the forming recess and supporting a lower surface of the aluminum sheet; and
   vacuum generators connected with air passages formed from two opposite sides of the auxiliary mold part to a bottom surface of the forming recess, the vacuum generators supplying or sucking air through the air passages, wherein the back plate is spaced apart from the auxiliary mold part, wherein the back plate is lowered by a forming pressure generated as the lower mold ascends and, if the forming pressure is released as the lower mold descends, the back plate is elevated, wherein the back plate includes a plate portion supporting the lower surface of the aluminum sheet, a plurality of elastic springs each of which has an upper end elastically installed in the plate portion and a lower end elastically installed in the auxiliary mold part, and a connection sleeve having an upper end fastened to the plate portion and a lower end supported on a ceiling of a lower space of the auxiliary mold part and vertically slidable, wherein the connection sleeve is lowered and raised according to the descent and ascent of the back plate to determine a range of the ascent of the back plate, wherein the lower ends of the elastic springs remain unchanged in position in the auxiliary mold part regardless of the descent and ascent of the back plate, and wherein the air is discharged from, or introduced to, spaces around the back plate by sucking the air through the air passages by the vacuum generators to thereby create a vacuum low pressure in the forming recess or by supplying the air through the air passages by the vacuum generators to thereby release the vacuum low pressure, wherein the connection sleeve includes a coupling portion fastened to a lower surface of the plate portion, a sliding portion inserted through the auxiliary mold part to be vertically slidable, and a head portion supported on the ceiling of the lower space of the auxiliary mold part to restrict the ascent of the back plate.

2. The mold structure of claim 1, wherein the air passages include air flow pipe portions formed through the auxiliary mold part and connected with the vacuum generators to allow the air to flow therethrough and long hole portions connected with respective ends of the air flow pipe portions and the bottom surface of the forming recess.

3. The mold structure of claim 2, wherein a spacing gap is formed between the lower surface of the back plate and the bottom surface of the forming recess to space the back plate away from the bottom surface of the forming recess by a predetermined height, and wherein a side gap is formed between a side surface of the back plate and an inner wall surface of the forming recess to allow the air to flow therethrough to introduce or discharge the air through the long hole portions throughout an entire edge of the back plate.

4. The mold structure of claim 1, wherein a block-shaped detection structure protrudes from a side surface of the upper mold, wherein a sensor is installed on a side surface, corresponding to the side surface of the upper mold, of the lower mold, wherein the sensor is pressed by the detection structure to detect approach of the lower mold and the upper mold, and wherein the vacuum generators are activated as the sensor detects the approach.

5. The mold structure of claim 4, wherein when the descent of the lower mold is detected, the vacuum generators supply the air.

\* \* \* \* \*